Oct. 6, 1964 J. H. WESSELS 3,152,223

MAGNETIC RECORDING OF VIDEO SIGNALS WITH MEANS FOR PROVIDING A CO-PHASE CHECK

Filed May 10, 1962

INVENTOR
JOHANNES H. WESSELS
BY
Frank R. Trifari
AGENT

United States Patent Office 3,152,223
Patented Oct. 6, 1964

3,152,223

MAGNETIC RECORDING OF VIDEO SIGNALS WITH MEANS FOR PROVIDING A CO-PHASE CHECK

Johannes Hendrik Wessels, Eindhoven, Netherlands, assignor to North American Philips Company, Inc., New York, N.Y., a corporation of Delaware Filed May 10, 1962, Ser. No. 193,763
Claims priority, application Netherlands May 15, 1961
1 Claim. (Cl. 178—6.6)

This invention relates to magnetic recording and/or scanning of high-frequency signals, particularly video signals, wherein at least two heads rotate in a slot of a drum in a plane at right angles to the axis of the drum, the signals being recorded on a tape-shaped magnetic carrier which is wound in the form of a helix around the drum.

In a known device of this type, at least two video heads are used, the first one being a recording head and the other a scanning head serving for a practically immediate check of the record; the two heads are diametrically arranged on a rotating element. Such a check, however, does not generally provide a co-phase relationship between the recorded signal and the scanned signal.

A primary object of the invention is to obtain a co-phase check. In accordance with the invention, the recording and auxiliary heads are arranged at such a place that they follow record tracks having a relative shift of a whole number of image rasters. If, as is common practice in many systems, one image raster is written on each video track (262.5 lines) in $\frac{1}{60}$ second, the distance between the two heads, measured in the direction of travel of the carrier, must be ¾ cm. with a speed of the magnetic carrier of for example 38 cms./sec.; in this case the recording head describes a track for the odd-numbered of the image raster, while the other head describes at the same instant a track of the even-numbered lines of the image raster. The auxiliary head is then arranged 262 or 263 lines behind the first head.

The device of the invention allows the achievement of a phase-correlated check and also provides additional advantages:

(1) The second head can serve as a spare head during playback. If the first head becomes defective the second head can immediately be put into operation, since this head follows an image line which is in the same phase as the image line written by the first head. Therefore, no additional apparatus is required.

(2) If drop-outs occur in the first head during playback, the second head can be automatically switched on. The possibility of a drop-out also occurring in the second head is very slight, provided the second head is physically remote from the first head to an extent such that no correlation exists between the drop-outs of the two heads. A distance of 0.5 cm. is generally sufficient for this purpose. Thus an image without drop-outs may be obtained regardless of the magnetic carrier used.

(3) The signals of the two heads may always be added to each other. There are in this case no longer 30 independent images per second, but this is hardly objectionable and a gain of 3 db in signal-to-noise ratio is obtained. In this case the heads must be so close to each other that the expansion and the shrinkage of the magnetic carrier do not cause any difficulty. A maximum distance of 1 cm. is permissible.

The single-head video magnetic recording and reproducing apparatus is particularly suitable for the principle described above as only one additional scanning head is required. The distance between two points on the carrier corresponding to a time difference of just one raster period is of the desired order of magnitude of 1 cm.

The invention will now be described more fully in the accompanying drawings, wherein.

Figure 1:
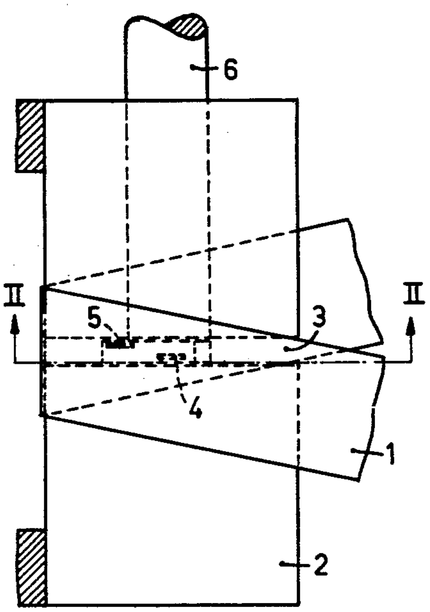
FIG. 1 is a plan view of the arrangement according to the invention.
Figure 2:
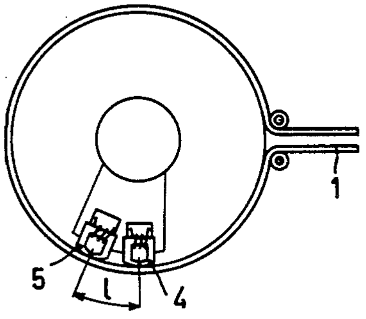
FIG. 2 is a sectional view along the line II—II of FIG. 1.
Figure 3:
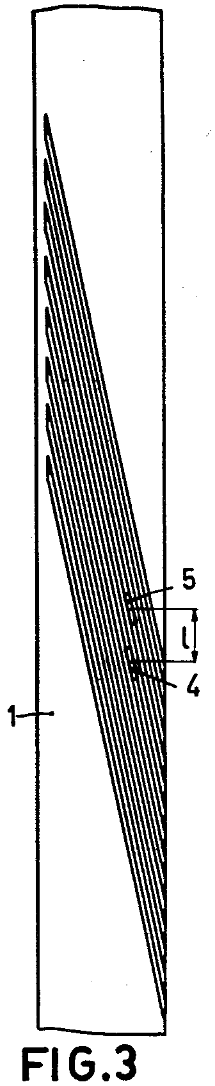
FIG. 3 is a development of the tape.

As shown in FIGS. 1 and 2, the tape 1 is helically wound around a drum 2; two magnetic heads 4, 5 are arranged perpendicular to the axis of the drum in a slit 3 and are rotated about a shaft 6. These magnetic heads are shifted with respect to each other along a distance which is a whole number of images measured in the direction of length of the tape. This is indicated in FIG. 3, which shows a one-image shift designated by letter "*l*."

While the invention has been described with respect to a specific embodiment, various modifications and variations thereof will be apparent to those skilled in the art without departing from the inventive concept, the scope of which is set forth in the appended claim.

What is claimed is:

Apparatus for recording high-frequency video signals, comprising: a cylindrical drum having an axis, a magnetic tape wound in the form of a helix around said drum, a magnetic recording head rotating in a slot of said drum in a plane making a right angle to the axis of the drum, said magnetic recording head coacting with said tape to record video signals thereon in tracks extending obliquely to the axis of the tape, each track comprising an image raster, and an auxiliary magnetic head also rotating in said slot at the same speed as said recording head, said auxiliary magnetic head being spaced a whole number of image rasters from said recording head, said spacing being measured in the direction of travel of the tape on the cylinder.

References Cited in the file of this patent

UNITED STATES PATENTS

| | | |
|---|---|---|
| 2,968,702 | Fay | June 17, 1961 |
| 2,996,576 | Dolby | Aug. 15, 1961 |
| 3,095,473 | Roizen | June 25, 1963 |

FOREIGN PATENTS

| | | |
|---|---|---|
| 788,862 | Great Britain | Jan. 8, 1958 |